United States Patent
Eberlein et al.

(10) Patent No.: US 7,092,730 B2
(45) Date of Patent: Aug. 15, 2006

(54) DYNAMIC CREATION OF CHANNELS IN A SIMULCAST WIRELESS COMMUNICATION SYSTEM

(75) Inventors: Keith Branden Eberlein, Cary, IL (US); Jeffrey Frank Thurston, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 690 days.

(21) Appl. No.: 09/960,756

(22) Filed: Sep. 21, 2001

(65) Prior Publication Data

US 2003/0060221 A1    Mar. 27, 2003

(51) Int. Cl.
*H04B 15/00* (2006.01)
*H04B 7/00* (2006.01)

(52) U.S. Cl. ............... 455/502; 455/518; 455/519

(58) Field of Classification Search ........... 455/503, 455/518, 519, 507, 508, 509, 517, 520, 500, 455/453; 370/389, 390, 315, 432, 312, 329; 375/359

See application file for complete search history.

(56) References Cited

U.S. PATENT DOCUMENTS

| | | | |
|---|---|---|---|
| 5,123,110 A | * | 6/1992 | Grube .................. 455/509 |
| 5,263,177 A | * | 11/1993 | Schieve et al. ............ 455/503 |
| 5,446,924 A | | 8/1995 | Christian et al. |
| 5,594,761 A | * | 1/1997 | Brown ...................... 375/356 |
| 5,625,866 A | | 4/1997 | Lidbrink et al. |
| 5,802,454 A | * | 9/1998 | Goshay et al. ............ 340/7.25 |
| 5,842,134 A | * | 11/1998 | Brown et al. ............... 455/503 |
| 5,867,488 A | | 2/1999 | DeRango et al. |
| 6,163,697 A | * | 12/2000 | Peterson et al. ............ 455/450 |

FOREIGN PATENT DOCUMENTS

| | | | |
|---|---|---|---|
| EP | 789464 A2 | * | 8/1997 |
| WO | WO 97/12455 | * | 3/1997 |
| WO | WO 01/65885 A1 | | 9/2001 |

* cited by examiner

*Primary Examiner*—Tilahun Gesesse
(74) *Attorney, Agent, or Firm*—Nicholas C. Oros; Indira Saladi (57) ABSTRACT

Dynamic allocation of communication resources in a wireless communication system employing simulcast transmission. When a simulcast station of a simulcast channel at a remote site becomes unavailable, a simulcast site controller determines if there is an unused simulcast station at the remote site. If there is an unused simulcast station, the simulcast site controller assigns the unused simulcast station to the simulcast channel thereby allowing the simulcast channel to continue to function. In an alternate embodiment, simulcast stations at a plurality of remote sites are dynamically assigned to simulcast channels as they become available.

19 Claims, 4 Drawing Sheets

— PRIOR ART —

DYNAMIC CREATION OF CHANNELS IN A SIMULCAST WIRELESS COMMUNICATION SYSTEM

FIELD OF THE INVENTION

This invention relates generally to communication systems, and more particularly, to wireless communication systems employing simulcast.

BACKGROUND OF THE INVENTION

Wireless communication systems employ simulcast to provide service over large areas or in hard to cover places such as deep inside buildings. With simulcast, transceivers at multiple base sites simultaneously transmit the same signal. As communication units, such as portable or mobile radios, move over the area covered by the wireless communication system, they are able to receive the signal from one or more of the base site transceivers. Because of the overlap of the areas covered by each of the base sites, there is a high probability that the communication units will be able to successfully receive the signal.

Figure 1:
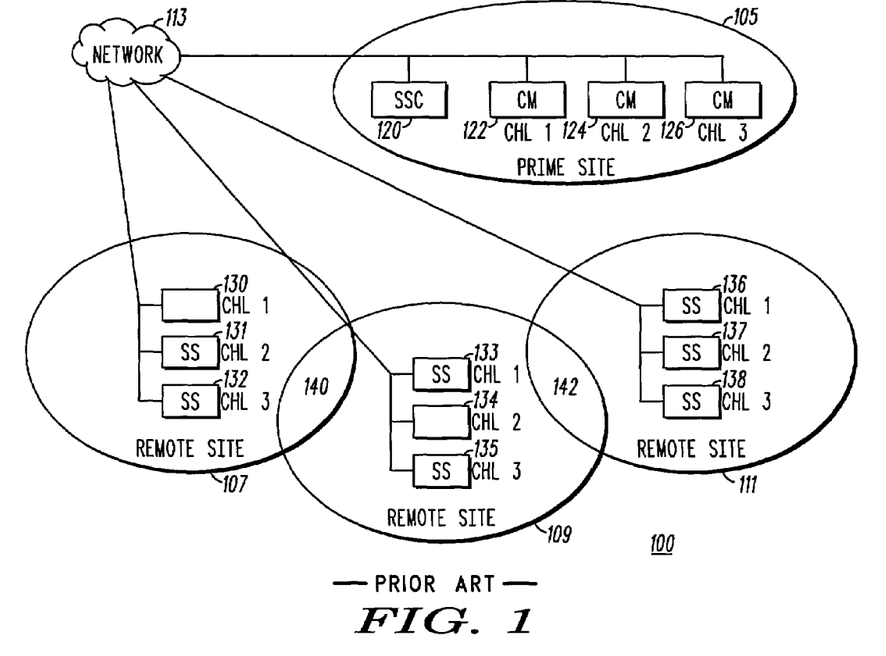
FIG. 1 is a diagram of a simulcast system of the prior art.

FIG. 1 shows an example of a simulcast system 100. The simulcast system 100 includes a prime site 105 and three remote sites 107, 109, 111 electrically coupled to a network 113. The prime site 105 and remote sites 107, 109, 111 are collectively referred to as a simulcast site. The prime site contains a simulcast site controller 120 and three comparators 122, 124, 126. Each of the remote sites 107, 109, 111 contains three simulcast stations 130–132, 133–135 and 136–138 respectively. The simulcast stations 130–138 are transceivers that transmit and receive signals to and from communication units (not shown) within a coverage area. The coverage areas of the remote sites 107, 109, 111 are illustrated by the circles on FIG. 1. The circles overlap to show that the coverage areas of the simulcast stations 130–138 at the different remote sites 107, 109, 111 overlap. When communication units (not shown) are in overlapping areas 140, 142, they may receive and transmit signals to and from more than one of the remote sites 107, 109, 111. For example, when a communication unit is in the overlapping area 140, it is able to receive and transmit signals to the remote site 107 and the remote site 109.

In the illustrated embodiment, the simulcast system 100 contains three simulcast channels. The comparator 122 and simulcast stations 130, 133, 136 (labeled as "CHL 1") comprise a first simulcast channel, the comparator 124 and simulcast stations 131, 134, 137 (labeled as "CHL 2") comprise a second simulcast channel and the comparator 126 and simulcast stations 132, 135, 138 (labeled as "CHL 3") comprise a third simulcast channel. For each of the three simulcast channels, the associated comparator 122, 124, 126 sends signals to be transmitted to each of the simulcast stations of the respective simulcast channel. The simulcast stations of each simulcast channel then simultaneously transmit the signals on the same frequency. For example, the comparator 122 of the first simulcast channel sends signals to the simulcast stations 130, 133, 136 of the first simulcast channel. The simulcast stations 130, 133, 136 of the first simulcast channel then transmit the signals simultaneously on the same frequency. The simulcast stations of each of the simulcast channels may also simultaneously receive signals from a communication unit if they are within range. The received signals are sent from each of the simulcast stations that receive the signal to the associated comparator 122, 124, 126 of the simulcast channel. For example, if a communication unit communicating on the first simulcast channel is located within the overlap area 140, the simulcast station 130 at the remote site 107 and the simulcast station 133 at the remote site 109 would receive a signal sent by the communication unit. The two simulcast stations 130, 133 would then send the signal to the comparator 122 associated with the first simulcast channel.

Occasionally, one of the simulcast stations will become unavailable. This could happen, for example, because of a malfunction of the simulcast station or because of problems with the network connection between the simulcast station and the comparator associated with the same simulcast channel. Heretofore, when a simulcast station becomes unavailable, the simulcast site controller 120 would shut down the entire simulcast channel containing the unavailable simulcast station. This was done because the simulcast system 100 doesn't know where the communication units (not shown) are located and hence does not know if service can reliably be provided to the communication units.

As an example of the shutdown of the simulcast channels, assume that the two simulcast stations 130, 134 of the simulcast system 100 shown by an 'X' in FIG. 1 become unavailable. The unavailability of the simulcast station 130 of the remote site 107 would cause the shut down of the first simulcast channel and hence the other two simulcast stations 133, 136 of the first simulcast channel would stop functioning. The unavailability of the simulcast station 134 at the remote site 109 would cause the shut down of the second simulcast channel and hence the other two simulcast stations 131, 137 of the second simulcast channel would stop functioning. As a result, the unavailability of two of the simulcast stations 130, 134 would cause two thirds of the simulcast stations 130–138 in the simulcast system 100 to become idle. This is not an efficient use of the resources of the simulcast system 100.

Accordingly, there is a need for a means to increase the number of simulcast channels that remain operational when simulcast stations become unavailable. This invention is directed to addressing this need.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

The following describes an apparatus for and method of increasing the number of simulcast channels available in a wireless communication system. In one embodiment of the present invention, when a simulcast station of a simulcast channel at a remote site becomes unavailable, a simulcast site controller determines if there is an unused simulcast station at the remote site. If there is an unused simulcast station, the simulcast site controller assigns the unused simulcast station to the simulcast channel thereby allowing the simulcast channel to continue to function. In another embodiment of the present invention, there is provided a method that allows simulcast channels to become quickly available when a simulcast site powers up. Upon power up, simulcast stations are dynamically assigned to simulcast channels as they become available.

Figure 2:
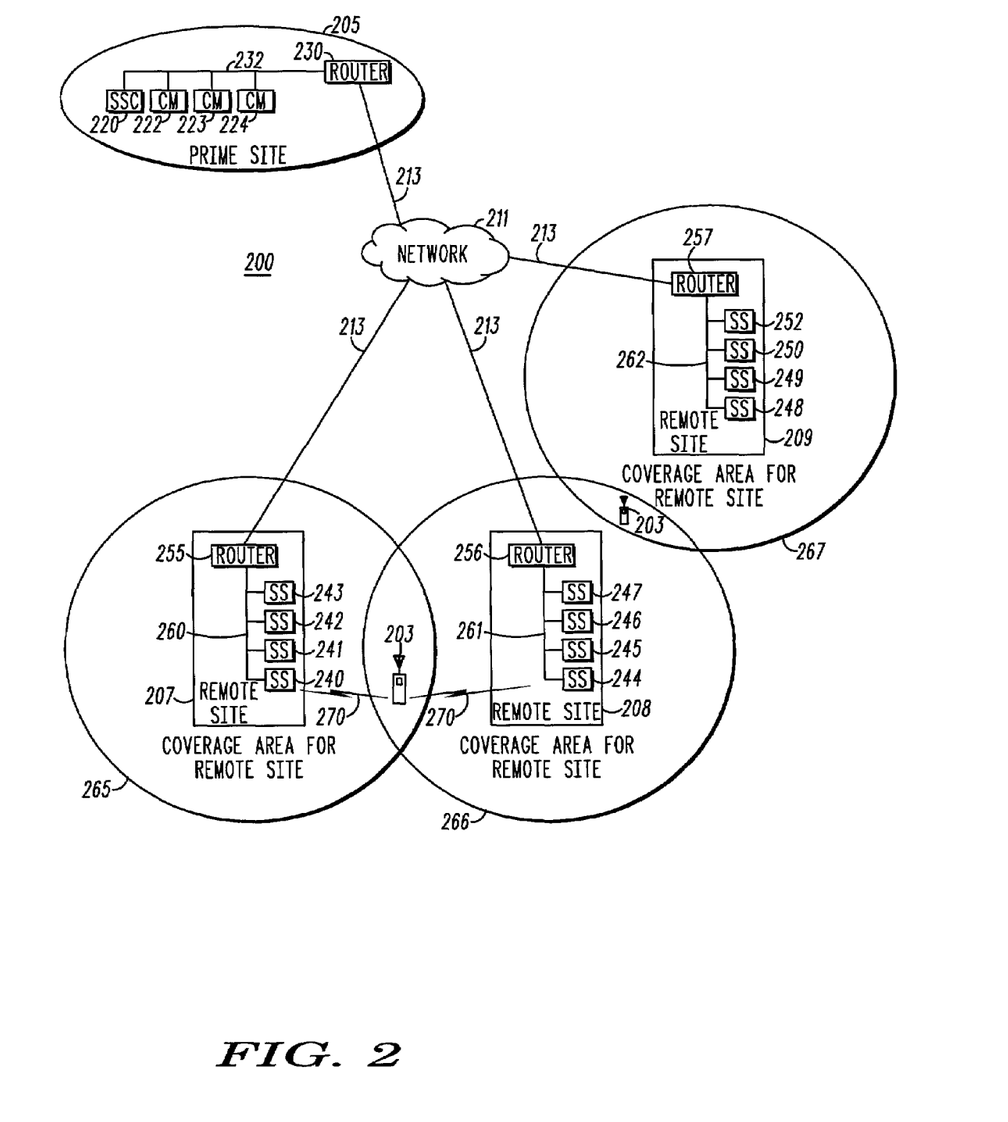
FIG. 2 is a diagram of a simulcast system according to one embodiment of the present invention.

With reference to FIG. 2, there is shown a wireless communication system 200 in accordance with one embodiment of the present invention. The wireless communication system 200 supports simulcast communication to communication units 203. Simulcast communication employs simultaneous transmission of signals from multiple fixed position transceivers to provide high reliability service to communication units. The wireless communication system 200 comprises a prime site 205, one or more remote sites 207–209 and a network 211. The remote and prime sites 205, 207–209 and network 211 are interconnected by a plurality of site links 213. The site links 213 may comprise for example, T1 lines, E1 lines, fiber optic lines, wireless links, or other suitable means for transporting data between the prime and remote sites.

Generally, the network 211 may be packet based or circuit switched and can employ any networking technology to link the various sites of the wireless communication system. These technologies can include, by way of example and not by way of limitation, IP routers, Frame Relay, ATM and Sonnet.

In one embodiment, the communication units 203 comprise wireless radio terminals that are equipped for 2-way communication of voice and data. The communication units 203 may be equipped for sending and receiving of IP datagrams (or packets) associated with multimedia calls (e.g., voice, data or video, including but not limited to high-speed streaming voice and video) and data transfers singly or simultaneously with other devices in the wireless communication system 200 or network 211. As will be appreciated, in general the communication units may comprise virtually any mobile or portable wireless radio units, cellular radio/telephones, devices having varying capacities to accommodate multimedia calls, video terminals, portable computers with wireless modems, or any other wireless devices.

The remote sites 207–209 contain fixed position transceivers called simulcast stations ("SS") 240–252 as well as routers 255–257 and local area networks (LANs) 260–262. At the remote site 207 the simulcast stations 240–243 are connected to the router 255 by the LAN 260; at the remote site 208 the simulcast stations 244–247 are connected to the router 256 by the LAN 261; and at the remote site 209 the simulcast stations 248–252 are connected to the router 257 by the LAN 262. The LANs 260–262 may be for example, Ethernet, Token Ring, or any other commercial or proprietary LAN technology. The routers 255–257 may be any commercially available or proprietary router. The simulcast stations at each remote site provide radio coverage using wireless communication resources 270 to respective coverage areas 265–267. In general, the coverage areas 265–267 of the remote sites 207–209 overlap so that the communication units 203 may receive and transmit radio signals to and from the simulcast stations 240–252 at more than one of the remote sites 207–209. Although the overlapping of coverage areas 265–267 of two sites are shown in FIG. 2, it will be appreciated that coverage areas from generally any number of remote sites may overlap. As will be appreciated, the wireless communication resources 270 may comprise any communication resource, such as, for example, radio frequency (RF) technologies, including, but not limited to Code Division Multiple Access (CDMA), Time Division Multiple Access (TDMA), Frequency Division Multiple Access (FDMA), and the like. Moreover, the invention of the present application may be used in any of the currently available RF communication systems, such as, for example, Global System for Mobile communication (GSM), General Packet Radio Service (GPRS), Universal Mobile Telecommunications Service (UMTS), Trans-European Trunked Radio service (TETRA), Association of Public Safety Communication Officers (APCO) Project 25, Personal Communication Service (PCS), Advanced Mobile Phone Service (AMPS) and the like. In the alternative, other wireless technologies, such as those now known or later to be developed and including, but not limited to, infrared, Bluetooth, electric field, electromagnetic, or electrostatic transmissions, may offer suitable substitutes.

In accordance with the present invention, preferred wireless communication resources 270 comprise multiple RF channels such as pairs of frequency carriers, TDMA time slots, CDMA channels, and the like. In one embodiment of the present invention, frequency division duplexing (FDD) may be employed where the wireless communication resources 270 comprise pairs of frequency carriers. One frequency carrier of the pair is used for transmissions from the simulcast stations 240–252 to the communication units 203 (called the outbound link) and the other frequency carrier of the pair is used for transmissions from the communication units 203 to the simulcast stations 240–252 (called the inbound link). In an alternative embodiment, time division duplexing may be employed where the wireless communication resources 270 are RF channels partitioned in time into sections. Some of the sections are used for transmissions from the simulcast stations 240–252 to communication units 203 and the other sections are used for transmissions from the communication units 203 to the simulcast stations 240–252.

The prime site 205 contains equipment for controlling and conducting the simulcast communication. The prime site 205 comprises a simulcast site controller ("SSC") 220 and a plurality of comparators ("CM") 222–224 linked to a router 230 by a local area network (LAN) 232. As with the remote sites 207–209, the LAN may be for example, Ethernet, Token Ring, or any other commercial or proprietary LAN technology and the router 230 may be any commercially available or proprietary router. The comparators 222–224 facilitate the simulcast communication for a particular wireless communication resource 270. For example, if each communication resource 270 comprises a pair of frequency channels for communication on the inbound link and outbound link, one comparator 222–224 would be associated with each communication resource 270.

The prime site 205 and the associated remote sites 207–209 together are referred to as a simulcast site. Within the simulcast site, each of the comparators is grouped with a selected one of the simulcast stations at each of the remote sites 207–209 to form a simulcast channel. All of the simulcast stations of a simulcast channel use the same wireless communication resource. For example, a first simulcast channel may comprise a first comparator 222, a first simulcast station 243 at a first remote site 207, a second simulcast station 247 at a second remote site 208 and a third simulcast station 252 at a third remote site 209. For the outbound link, all three of the simulcast stations 243, 247, 252 of the first simulcast channel receive data to be transmitted over the site links 213 and network 211 from the first comparator 222 and transmit the data simultaneously over the same wireless communication resource 270. For the inbound link, the three simulcast stations 243, 247, 252 of the first simulcast channel will receive transmissions from the communication units 203 if they are within range. The received signals will then be sent to the first comparator 222 over the site links 213 and network 211. While this example grouped three particular simulcast stations and comparator into a simulcast channel, it should be understood that generally any of the simulcast stations at a remote site may be included within any particular simulcast channel. This enables functioning of the simulcast channel to be maintained even when a simulcast station of the simulcast channel becomes unavailable as will be discussed in relation to FIG. 3

For the inbound link, a comparator associated with a simulcast channel receives signals from the simulcast stations of the simulcast channel. Generally, these signals comprise some representation of the signal received by the simulcast stations from the communication units. For example, the simulcast stations of a simulcast channel may send packets containing digitized sampled versions of the signals received from a communication unit. The comparator creates a resultant signal from the signals sent from the simulcast stations of the associated simulcast channel using a process referred to as voting. Any of several voting methods may be used. For example, the comparator may combine the signals from the different simulcast stations on the associated simulcast channel to form a combined signal or may choose one of the signals as a "best" signal. One method of voting that could be used is described in U.S. Pat. No. 5,719,871 titled, "Method and Apparatus for Performing Diversity Voting in a Communication System", that is assigned to the assignee of the present invention and is hereby incorporated by reference in its entirety. Other methods of voting that could be used are described in U.S. patent application Ser. No. 09/327785 titled, "Comparator and Methods for Voting Therewithin," that is assigned to the assignee of the present invention and is hereby incorporated by reference in its entirety.

In one embodiment of the present invention, one of the simulcast channels at the simulcast site is used as a control channel. The control channel is used for the sending of control information to and from the communication units 203. Control information can include for example, the assignment of a particular communication unit 203 to a particular simulcast channel. Other simulcast channels at the simulcast site are used as payload channels. Payload channels are used to carry data to and from the communication units 203. This data can include, for example, voice conversations, video, multimedia traffic, web pages, computer files, etc.

In one embodiment of the present invention, communication between the different elements of the wireless communication system 200 such as the simulcast sites 240–252, comparators 222–224, and controller 220 is accomplished using the well known Internet protocol (IP). Data to be sent between the elements of the wireless communication system 200 is placed into packets with each packet also containing the IP address of the destination. The routers 230, 255–247 and network 211 use the IP address to direct the packets to the correct destination. The destination IP addresses may be unicast or multicast. Generally, unicast IP addresses correspond to a single destination device while multicast IP addresses correspond to multiple destination devices. In one embodiment, the wireless communication network 200 uses multicast IP addresses to send data from the comparators 222–224 to the simulcast stations of the corresponding simulcast channel for the outbound links. For example, in the embodiment where simulcast stations 243, 247, 252 and comparator 222 comprise the first simulcast channel, a multicast IP address is used for sending control or payload packets to the three simulcast stations 243, 247, 252 of the first simulcast channel. The first comparator 222 would place the multicast IP address in the IP packets sent to the three simulcast stations 243, 247, 252. In general, the comparators 222–224 sending data to the simulcast stations 240–252 for transmission on the outbound link also include a timestamp with the data. The timestamp informs the simulcast stations 240–252 when to begin transmission of the data so that all of the simulcast stations within a simulcast channel transmit simultaneously.

It will be appreciated that the wireless communication system 200 may contain many other elements than those shown in FIG. 2. For example, the wireless communication system 200 may contain other simulcast sites. Each of the other simulcast sites may comprise a prime site and a plurality of remote sites. The elements of the prime site such as the comparators and simulcast site controller may be combined with one of the remote sites to form a combined remote/prime site. The wireless communication system 200 may also contain other types of sites such as repeater sites that reuse the communication resources on a site by site basis instead of using simulcast communication (i.e. such as in a cellular communication system) or console sites that contain one or more dispatch consoles.

As will be further appreciated, the wireless communication system 200 may contain a link such as, for example a T1 line or E1 digital carrier system that connects the network 211 to a public switched telephone network (PSTN) via a telephone gateway, a paging network or short message system via a paging gateway, and a facsimile machine or similar device via a fax gateway or modem. In addition, the wireless communication system 200 may be connected via a gateway to a number of additional content sources, such as the Internet or various Intranets. In support thereof, the wireless communication system 200 may include any number or type of wire line communication device(s), site controller(s), simulcast site controller(s), comparator(s), telephone interconnect device(s), internet protocol telephony device(s), call logger(s), scanner(s) and gateways, collectively referred to herein as a fixed communication device(s) or simply fixed devices. Generally, such fixed communication devices may be either sources or recipients of data and/or control messages routed through the wireless communication system 200.

Figure 3:
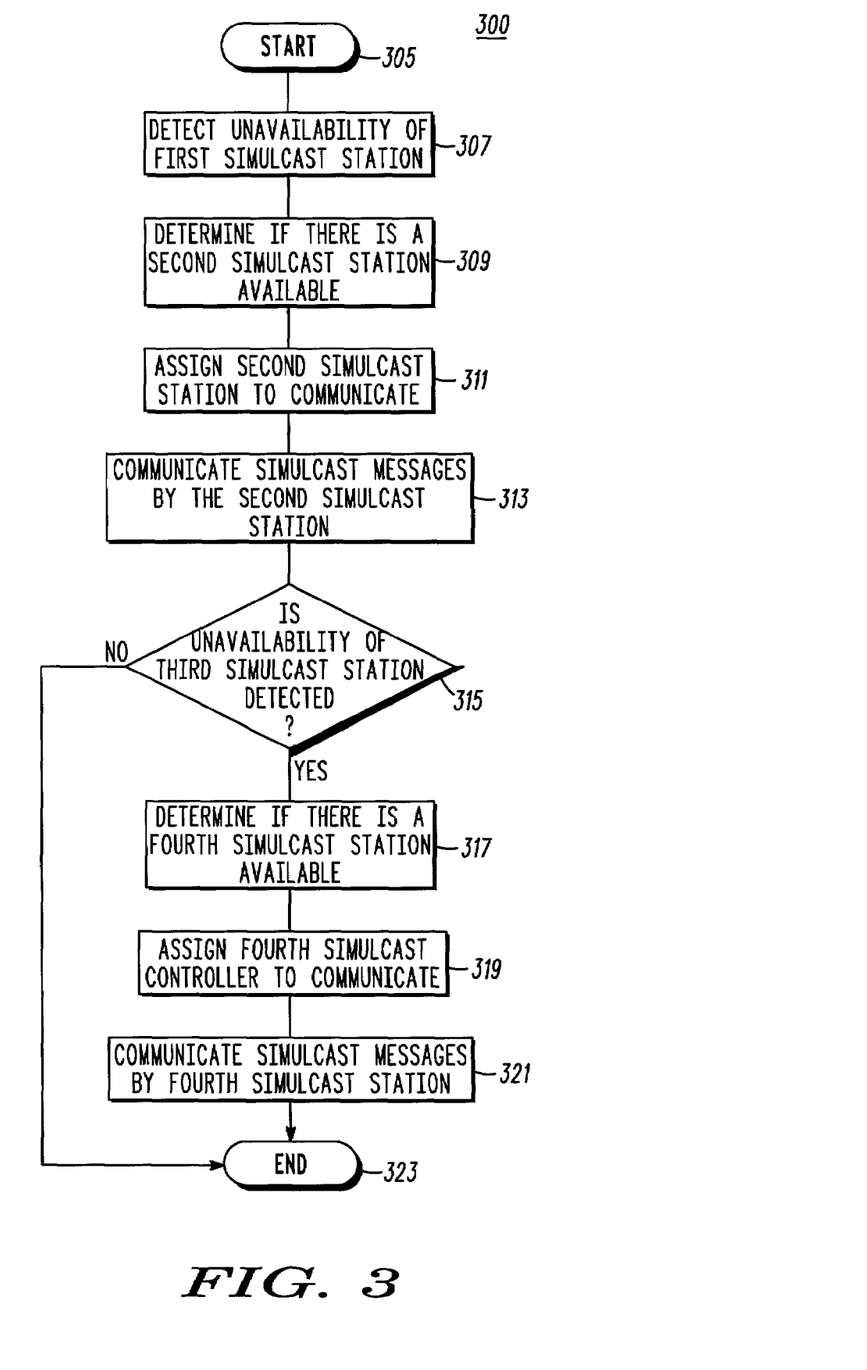
FIG. 3 is a flowchart illustrating a method whereby the functioning of a simulcast channel can be maintained when one of the simulcast stations of the simulcast channel becomes unavailable.

FIG. 3 is a flowchart illustrating a method whereby the functioning of a simulcast channel of a communication system can be maintained even if one or more of the simulcast stations of the simulcast channel becomes unavailable. At step 307, there is detected the unavailability of a first simulcast station communicating on a first communication resource at a first remote site. This unavailability can be due to a malfunction of the first simulcast station, a problem with the connection between the first simulcast station and a router or some other reason. Either a comparator or simulcast site controller may detect the unavailability of the first simulcast station. The detection of unavailability may be accomplished by the first simulcast station sending a notification message to the comparator or simulcast site controller. The unavailability may also be detected by the first simulcast station failing to respond to a message from one of the comparators or the simulcast site controller. As will be appreciated other devices within the communication system such as routers may perform detection of the unavailability of the first simulcast station.

Next, at step 309, it is determined if there is a second simulcast station available at the first remote site for communication on the first communication resource. In one embodiment, this is accomplished by the simulcast site controller consulting a database of simulcast station assignments or querrying the simulcast stations at the first remote site to determine their status. If the second simulcast station is available for communication on the first communication resource, the simulcast site controller assigns the second simulcast station to join the simulcast channel at step 311. At step 313, the second simulcast station then communicates simulcast messages on the first communication resource.

At step 315, the unavailability of a third simulcast station communicating on the first communication resource at a second remote site may be detected. As with the first simulcast station, the unavailability of the third simulcast station may be due to a malfunction of the third simulcast station, a problem with the connection between the third simulcast station and a router or other portions of a network within the communication system, or some other reason. Either the comparator or the simulcast site controller may detect the unavailability of the third simulcast station using the same methods as with the detection of the failure of the first simulcast station. If the unavailability of the third simulcast station is detected, it is determined at step 317 if there is a fourth simulcast station at the second remote site available for communicating on the first communication resource. If the fourth simulcast station is available, the simulcast site controller assigns at step 319 the fourth simulcast station to become a part of the simulcast channel. At step 321, the fourth simulcast station then communicates simulcast messages on the first communication resource. At step 315, if the unavailability of the third simulcast station 244 is not detected, the process ends.

The functioning of the method of FIG. 3 can be illustrated by way of an example. For purposes of the example, assume that the wireless communication system 200 of FIG. 2 has three simulcast channels. The first simulcast channel comprises comparator 222 and simulcast stations 240, 244, 248 at the three remote sites 207, 208, 209, respectively; the second simulcast channel comprises comparator 223 and simulcast stations 241, 245, 249 at the three remote sites 207, 208, 209 respectively; and the third simulcast channel comprises comparator 224 and simulcast stations 242, 246, 250, at the three remote sites 207, 208, 209, respectively. If the simulcast station 240 (site 207) of the first simulcast channel malfunctions, it sends a notification to the comparator 222 associated with the first simulcast channel. The comparator 222 then notifies the simulcast site controller 220 of the malfunction. The simulcast site controller 220 determines that there is another simulcast station at the remote site 207 (e.g. simulcast station 243) that is not being used as part of any simulcast channel and thereafter assigns the unused simulcast station 243 to the first simulcast channel. The simulcast station 243 tunes to the communication resource 270 used by the first simulcast channel and then communicates simulcast messages on the first simulcast channel. Hence the first simulcast channel remains functional even after the failure of one of the simulcast stations belonging to the channel.

Then suppose that the simulcast station 248 (remote site 209) of the first simulcast channel becomes unavailable because of problems with the connection to the router 257. The comparator 222 detects the unavailability of the simulcast station 248 because of the lack of communication from the simulcast station 248. The comparator 222 notifies the simulcast site controller 220 which in turn determines that there is a simulcast station 252 (remote site 209) that is not being used for any simulcast channel. The simulcast site controller assigns the simulcast station 252 to the first simulcast channel. The simulcast station 252 tunes to the communication resource 270 used by the first simulcast channel and then communicates simulcast messages of the first simulcast channel. The first simulcast channel then contains the simulcast stations 243 (remote site 207), 244 (remote site 207) and 252 (remote site 209). The method of FIG. 3 has permitted the first simulcast channel to continue functioning despite the unavailability of two simulcast stations that were originally part of the first simulcast channel.

The method of FIG. 3 may also be used to increase the number of simulcast channels available at a simulcast site even when there are no unused simulcast stations at the remote sites. This can be illustrated by a second example. For convenience the second example will refer to the same three simulcast channels as initially defined in the previous example. Also, it is assumed that the three simulcast stations 243, 247, 252 (initially not assigned to any simulcast channel) are unavailable. If the first simulcast station 240 of the first simulcast channel becomes unavailable, there are no unused simulcast stations at site 207, thus the simulcast site controller 220 can not initially assign a unused simulcast station at site 207 to replace it. The first simulcast channel must then be disabled causing the other two simulcast stations 244, 248 of the first simulcast channel to become unused. These two simulcast stations 244, 248 are then eligible for reassignment to other simulcast channels. Next, suppose a simulcast station 245 (remote site 208) of the second simulcast channel becomes unavailable. The simulcast site controller determines that the simulcast station 244 (remote site 208), having been assigned to the now-disabled first simulcast channel, is now unused and available for reassignment to the second simulcast channel. The simulcast site controller assigns the simulcast station 244 to the second simulcast channel and thereby allows the second simulcast channel to remain functioning. Hence the use of the method of FIG. 3 allows two of the three simulcast channels to remain functioning despite the failure of simulcast stations in two of the simulcast channels. It will be appreciated that while the two examples using the method of FIG. 3 described above used simulcast sites with three simulcast channels, in general, the method of FIG. 3 can be applied to simulcast sites with any number of simulcast channels.

Figure 4:
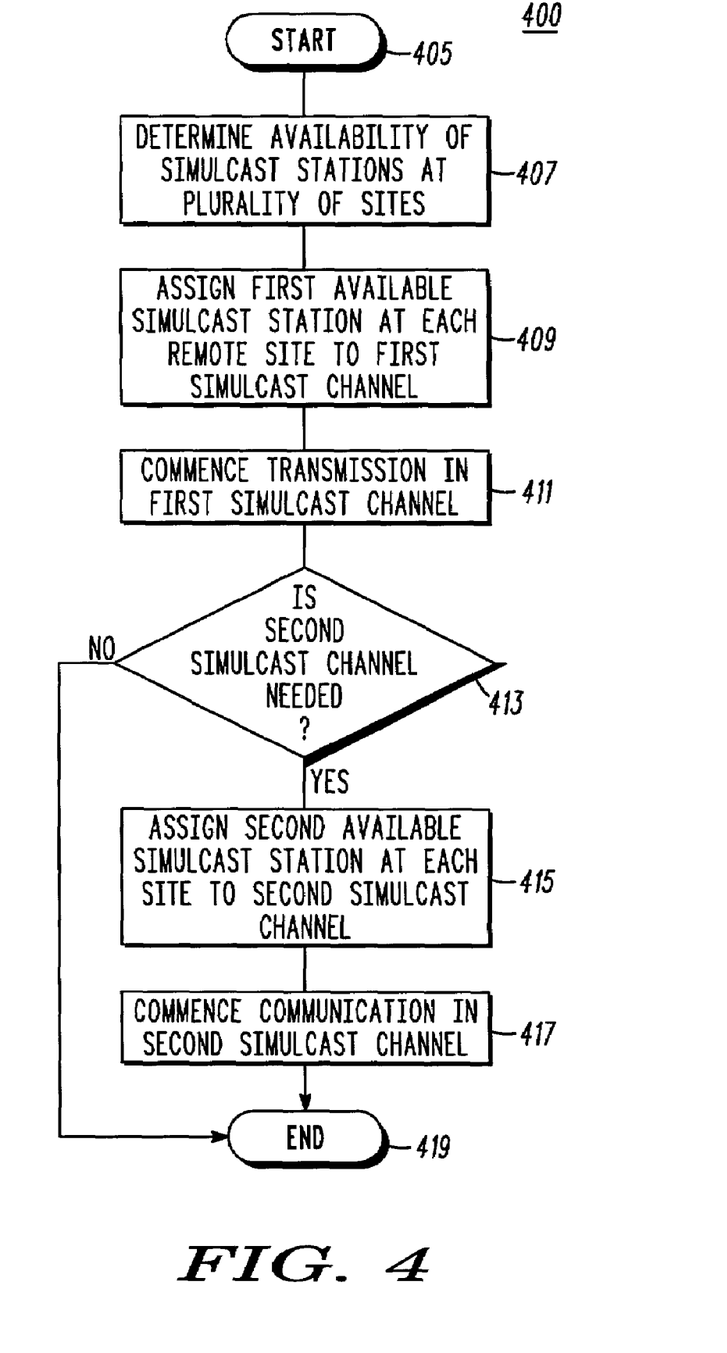
FIG. 4 is a flowchart illustrating a method for the simulcast stations of a simulcast site to be assigned to the various simulcast channels.

FIG. 4 is a flowchart illustrating a method for different simulcast stations of a simulcast site to be assigned to one or more simulcast channels. This method can be used when the simulcast site is powered up or when the simulcast stations are being reconfigured among different simulcast channels. At step 407, the availability of the simulcast stations located at a plurality of remote sites of the simulcast site is determined. As will be appreciated, the time that it takes the simulcast stations to become available after being turned on or reconfigured can take anywhere from less than a second to several minutes depending on the type of simulcast station and any problems or issues that arise during the powering on process. Because of this, the simulcast stations may become available for assignment at different times even if they are turned on at exactly the same time. As the simulcast stations become available (i.e. powered on and functioning) a simulcast site controller assigns at step 409 the first simulcast station to become available at each remote site to a first simulcast channel. After one simulcast station at each of the plurality of remote sites of the simulcast site has been assigned to the first simulcast channel, the simulcast stations assigned to the first simulcast channel commence transmission at step 411.

At step 413, a decision is made as to whether a second simulcast channel is needed at the simulcast site. If a second simulcast channel is needed, the second of the simulcast stations to become available at each of the remote sites of the simulcast site is assigned to the second simulcast channel. Once a simulcast station at each of the remote sites has been assigned to the second simulcast channel, the simulcast stations assigned to the second simulcast channel commence transmission at step 413. If at step 413, the second simulcast channel is not needed, then the process ends after step 413. It will be appreciated that while this process was described in terms of a simulcast site with one or two simulcast channels, in general, it could be applied to simulcast sites with any number of simulcast channels. Furthermore, it will be appreciated that in one embodiment of the present invention the first simulcast channel could be a control channel while the second simulcast channel could be a payload channel.

The functioning of the method of FIG. 4 can be illustrated by way of an example. Assume for purposes of the example that the remote sites 207–209 of the wireless communication system 200 of FIG. 2 have just been turned on. As the simulcast stations 240–252 power up they become functional in the following order: simulcast station 243, simulcast station 241, simulcast station 246, simulcast station 240, simulcast station 249, simulcast station 247, simulcast station 252, simulcast station 242, etc. As the simulcast stations become operational, the simulcast site controller 220 assigns the first available simulcast station at each of the remote sites to a first simulcast channel. The simulcast stations assigned to the first simulcast channel are simulcast station 243 (remote site 207), simulcast station 246 (remote site 208) and simulcast station 249 (remote site 209). After simulcast station 249 becomes functional, the first simulcast channel becomes operational and the simulcast stations 243, 246, 249 commence communication on the first simulcast channel. Further assume that a second simulcast channel is desired in the wireless communication system 200. As the simulcast stations become operational, the simulcast site controller 220 assigns the second available simulcast station at each of the remote sites to the second simulcast channel. The simulcast stations assigned to the second simulcast channel are simulcast station 241 (remote site 207), simulcast station 247 (remote site 208), and simulcast station 252 (remote site 209). After simulcast station 252 becomes functional, the second simulcast channel becomes operational and the simulcast stations 241, 247, 252 commence communication on the second simulcast channel.

The present disclosure has identified methods for increasing the utilization of simulcast stations in a wireless communication system by dynamically reassigning unused simulcast stations to replace simulcast stations that become unavailable. This allows the simulcast channels to remain functioning despite the fact that one of the simulcast stations of the simulcast channel has become unavailable. Additionally, the present disclosure has identified a method for shortening the amount of time until simulcast channels become available when a simulcast site is powered up. The simulcast stations are dynamically assigned to the simulcast channels as they become available.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system comprising at least a first and second simulcast station at a first remote site, a method comprising:

detecting, by a simulcast site controller, unavailability of the first simulcast station for communicating on a first communication resource;

determining, by a simulcast site controller, if the second simulcast station is available for supporting simulcast transmissions on the first communication resource; and     if the second simulcast station is available, assigning, by a simulcast she controller, the second simulcast station to communicate on the first communication resource, sending, by a comparator, data to be communicated over the simulcast channel to one or more of the simulcast stations along with a timestamp specifying when the data will be transmitted, and communicating, by the second simulcast station, simulcast messages on the first communication resource, and     wherein the communication system further comprises a plurality of simulcast stations distributed among a plurality of remote sites and where a subset of the plurality of simulcast stations communicates on the first communication resource and wherein the controller, comparator and simulcast stations are connected by an Internet Protocol network and the simulcast stations that communicate on the first communication resource share a multicast Internet Protocol address.

2. The method of claim 1 wherein the step of detecting is accomplished by the simulcast site controller failing to receive a response to a message sent to the first simulcast station.

3. The method of claim 1 wherein the step of detecting is further accomplished by the first simulcast station notifying the comparator of a malfunction and the comparator notifying the simulcast site controller of the malfunction.

4. The method of claim 1 wherein the step of detecting is further accomplished by the comparator notifying the simulcast site controller of a failure of the comparator to receive a response from a message sent by the comparator to the first simulcast station.

5. The method of claim 1 wherein the step of assigning is accomplished by sending an Internet Protocol packet to the second simulcast station containing the multicast Internet Protocol address of the simulcast stations that communicate on the first communication resource.

6. The method of claim 1 further comprising the step of sending, by the simulcast site controller, an Internet Protocol packet instructing the first simulcast station to shut down.

7. The method of claim 1 wherein the unavailability of the first simulcast station is due to a problem with the connection between the first simulcast station and the comparator.

8. The method of claim 1 wherein, the communication system further comprises a third and fourth simulcast station at a second remote site, the method further comprising:

detecting, by the simulcast site controller, the unavailability of the third simulcast station communicating on the first communication resource at the second remote site;

determining, by the simulcast site controller, if the fourth simulcast station is available for supporting simulcast communication on the first communication resource and, if the fourth simulcast station is available;

assigning, by the simulcast she controller, the fourth simulcast station to communicate on the first communication resource; and communicating, by the fourth simulcast station, simulcast messages on the first communication resource.

9. The method of claim 1 wherein the unavailability of the first simulcast station is due to a malfunction of the first simulcast station.

10. The method of claim 1 further comprising:
determining availability of a plurality of simulcast stations located at the plurality of remote sites;
assigning, by a simulcast site controller, members of a first simulcast channel, the members comprising respective first available simulcast stations at each of the remote sites; and
performing simulcast communication using the first simulcast channel.

11. The method of claim 10 wherein the first simulcast channel is used for communication of control information.

12. The method of claim 10 further comprising:
assigning, by the simulcast site controller, members of a second simulcast channel, the members comprising respective second-available simulcast stations at each of the remote sites; and
commencing simulcast communication using the second simulcast channel.

13. The method of claim 12 wherein the second simulcast channel is a payload channel.

14. In a communication system comprising at least a first and second simulcast station at a first remote site, a method comprising:
detecting, by a simulcast site controller unavailability of the first simulcast station for communicating on a first communication resource by the first simulcast station notifying the comparator of a malfunction and the comparator notifying the simulcast site controller of the malfunction;
determining, by a simulcast site controller, if the second simulcast station is available for supporting simulcast transmissions on the first communication resource; and
if the second simulcast station is available, assigning, by a simulcast site controller, the second simulcast station to communicate on the first communication resource, sending, by a comparator, data to be communicated over the simulcast channel to one or more of the simulcast stations along with a timestamp specifying when the data will be transmitted, and communicating, by the second simulcast station, simulcast messages on the first communication resource.

15. The method of claim 14 further comprising the step of sending, by the simulcast site controller, an Internet Protocol packet instructing the fast simulcast station to shut down.

16. The method of claim 14 further comprising:
determining availability of a plurality of simulcast stations located at the plurality of remote sites:
assigning, by a simulcast site controller, members of a first simulcast channel, the members comprising respective first-available simulcast stations at each of the remote sites; and
performing simulcast communication using the first simulcast channel.

17. In a communication system comprising at least a first and second simulcast station at a first remote site, a method comprising:
detecting, by a simulcast site controller, unavailability at the first simulcast station for communicating on a first communication resource, wherein the unavailability of the first simulcast station is due to a problem with a connection between the first simulcast station and a comparator;
determining, by a simulcast site controller, if the second simulcast station is available for supporting simulcast transmissions on the first communication resource; and
if the second simulcast station is available, assigning, by a simulcast site controller, the second simulcast station to communicate on the first communication resource, sending, by a comparator, data to be communicated over the simulcast channel to one or more of the simulcast stations along with a timestamp specifying when the data will be transmitted, and communicating, by the second simulcast station, simulcast messages on the first communication resource.

18. The method of claim 17 further comprising the step of sending, by the simulcast site controller, an Internet Protocol packet instructing the first simulcast station to shut down.

19. The method of claim 17 further comprising:
determining availability of a plurality of simulcast stations located at the plurality of remote sites;
assigning, by a simulcast site controller, members of a first simulcast channel, the members comprising respective first-available simulcast stations at each of the remote sites; and
performing simulcast communication using the first simulcast channel.

* * * * *

UNITED STATES PATENT AND TRADEMARK OFFICE
CERTIFICATE OF CORRECTION

PATENT NO. : 7,092,730 B2
APPLICATION NO. : 09/960756
DATED : August 15, 2006
INVENTOR(S) : Eberlein et al.

It is certified that error appears in the above-identified patent and that said Letters Patent is hereby corrected as shown below:

In Claim 1, column 10, line 17, change "she" to --site--

In Claim 8, column 10, line 1, change "she" to --site--

In Claim 10, column 11, line 14, change "first available" to --first-available--

In Claim 14, column 11, line 32, after the word "controller" add --,--

In Claim 15, column 12, line 3, change "fast" to --first--

Signed and Sealed this

Twentieth Day of March, 2007

JON W. DUDAS
*Director of the United States Patent and Trademark Office*